Dec. 23, 1958  J. L. RUSSELL  2,866,028
ELECTRICALLY ACTUATED CONTACTOR
Filed June 14, 1955  2 Sheets-Sheet 1
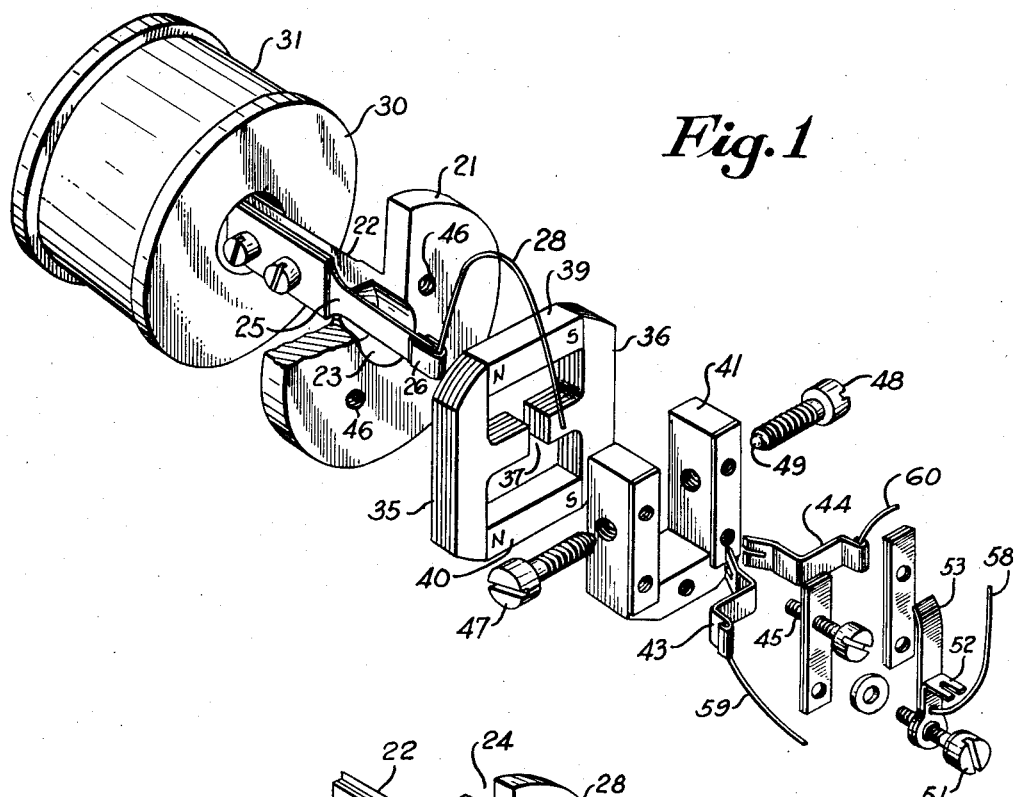
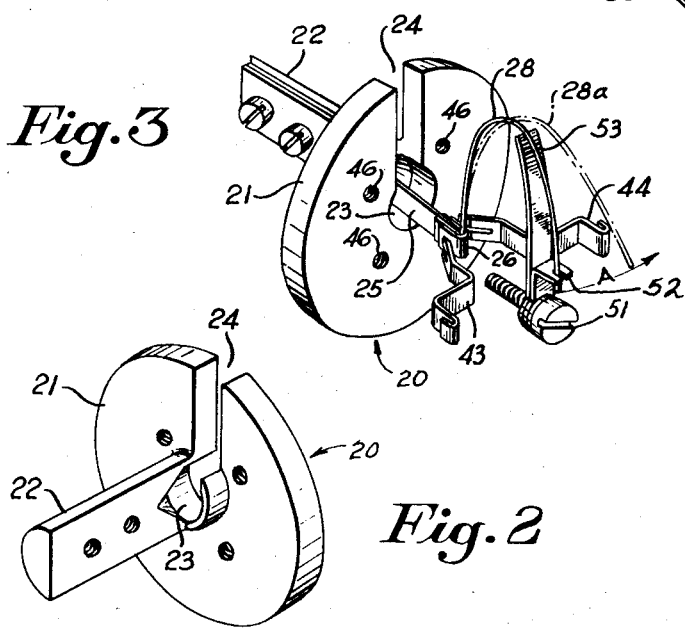

Dec. 23, 1958  J. L. RUSSELL  2,866,028
ELECTRICALLY ACTUATED CONTACTOR
Filed June 14, 1955  2 Sheets-Sheet 2

United States Patent Office 2,866,028
Patented Dec. 23, 1958

2,866,028

ELECTRICALLY ACTUATED CONTACTOR

John L. Russell, Naugatuck, Conn., assignor to The Bristol Company, Waterbury, Conn., a corporation of Connecticut Application June 14, 1955, Serial No. 515,373

13 Claims. (Cl. 200—93)

This invention relates to electrically actuated contactors, and more especially to a form of contactor adapted for use in electrical measurement and control apparatus wherein weight and space are restricted.

It has been a generally desirable characteristic of electrically actuated contactors that switching be effected synchronously with predetermined changes in an electric current or voltage. However, it is not always essential that such changes be periodic in their nature or that the contacting action be isochronous in its timing. Thus, while many such devices of the prior art have depended for their effective performance upon mechanical resonance at a predetermined frequency, such a property in the applications to which reference is made may prove not only superfluous, but actually detrimental to satisfactory operation.

While devices of the nature set forth in United States Letters Patent No. 2,636,094 granted to me on April 21, 1953, are well known in their application as inverters of small unidirectional potentials for the eventual control of self-balancing networks, and are best suited to that purpose in their double-pole form as described, there has been found a continually increasing demand for such contactors in uses where the desired function may be accomplished with a single-pole switching mechanism. Among such uses may be mentioned "D.-C. amplifiers," voltage comparators and high-speed relays.

It is an object of this invention to provide a miniaturized commutating device of reduced size and weight and having a minimum electrical capacitance between conducting portions which may simultaneously attain different electrical potentials.

It is a further object to provide an electrically actuated synchronous commutating device wherein the electrical contact members and the electrical circuit responsible for their operation are effectively segregated by electrostatic shielding.

It is a further object to provide such a device capable of a wide variety of uses, and in particular one in which a simple adjustment at the time of assembly serves to adapt it alternatively to use as a "chopper," wherein the movable contact member may with equal facility engage either of the associated stationary contacts, or as a single-pole double-throw relay wherein the movable contact is normally biased into engagement with one of the stationary contacts and abruptly transferred into engagement with the other stationary contact upon change in excitation of the magnetizing winding.

It is a further object to provide a device of the above nature in which the alternating-current winding is readily removable for replacement, and to which one or more of a variety of types or ratings of said winding may be fitted without disturbing the magnetic circuit or the mechanical arrangement of operating parts.

It is a further object to provide a commutating device wherein the coacting contact members are clearly visible and accessible when the device is assembled in operating condition.

It is a further object to provide a device of the above nature wherein the distribution of flux in various parts of the magnetic circuit may readily be adjusted to a condition consistent with optimum performance.

It is a further object to provide a contacting device of the above nature wherein the contacting system may be subjected to an adjustment adapting it alternatively to use as a "chopper," wherein the movable contact member may with equal facility engage either of the associated stationary contacts, or as a single-pole double-throw relay wherein the movable contact is normally biased into engagement with one of the stationary contacts and abruptly transferred into engagement with the other stationary contact upon change in excitation of the magnetizing winding.

It is a further object to provide a device of the above nature adapted for non-resonant action through a wide range of operating frequencies and including means for inhibiting incipient resonance should such make its appearance under any operating condition.

Further objects as well as advantages of this invention will be apparent from the following description thereof and the accompanying drawings in which:

Figure 1 is an isometric exploded view of the parts of a contactor embodying the principles of the invention;

Figure 2 is an isometric view of a mechanical element of the device shown in Figure 1;

Figure 3 is an isometric view of certain interrelated parts of the device, positioned in one of their possible operating relationships.

Figure 4:
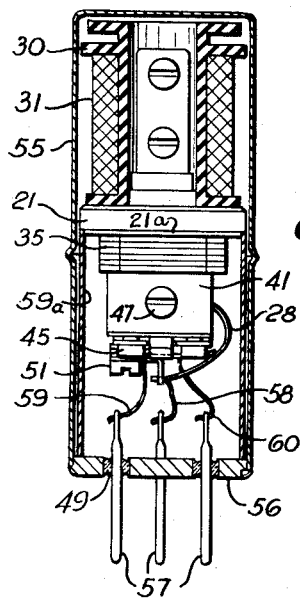
Figure 4 is a vertical cross sectional view of an assembled device.

Referring now to the drawings, a supporting member 20, shown isolated in Figure 2, comprises a flat cylindrical base portion 21 and a coaxially disposed stem portion 22, integrally formed from one piece of brass or equivalent non-magnetic material of high thermal conductivity. The member 20 is formed with a central bore 23 extending through the base portion 21 and penetrating the stem portion 22. One side of said stem portion is of cylindrical curvature coaxial with that of the base portion 21, and the other side is flattened to provide a plane surface parallel to said axis. The section of said stem portion is less than a semicircle, so that the axis of the structure does not lie within the stem part, but is displaced from the plane surface by a small distance, the purpose of which will hereinafter be set forth. A radial slot 24, formed in the base portion 21 and extending from the periphery thereof into the central bore 23, provides access thereto for placing, inspecting, and adjusting small parts presently to be described.

Figure 7:
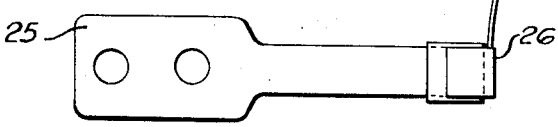
Figures 7 and 8 are respectively side, and edge elevations of a component of the device embodying the invention.
Figure 8:

Mounted upon the flat surface of the stem portion 22, and extending through the opening 23 in the base portion 21, is a member 25 formed of sheet silicon steel or equivalent ferromagnetic material. As indicated in Figure 7 the member 25 is "paddle" shaped, having a relatively broad base part substantially the width of the stem portion 22, while the extending part or "tongue," forming a cantilever armature, is made narrow, of small inertia, and relatively stiff in construction, and so proportioned that it will not have a resonant frequency within the range of any alternating excitation to which it may be subjected in service. The previously mentioned displacement of the plane surface of the stem portion 22 of the member 20 from the cylindrical axis is preferably half the thickness of the member 25, so that when assembled the center line of said member 25 will coincide with said axis. As fully set forth in my previous Patent No. 2,636,094, the material of which the member 25 is formed need not be especially critical in its magnetic characteristics, the general requirement being that it possess good permeability and that it become saturated at a relatively low proportion of the magnetizing influence to which it will be subjected in operation.

Carried by the free extremity, or tongue portion, of the member 25 and electrically insulated therefrom is a double-faced contact member 26 formed preferably of one of the alloys in the platinum group. This part of the assembly may readily be effected by forming the piece of contact metal in a U-shape, inserting the extremity of the member 25 insulated by small barriers of mica or equivalent, clamping these component parts into an integral assembly and firmly securing them in place with a suitable cementitious material. Permanent electrical connection to said movable contact member is made by means of a resilient wire 28 having one end soldered or welded to the member 26. The conformation and further securing of the wire 28 constitute important features of the invention, and will hereinafter be described in detail. Variable magnetization of the member 25 is effected by means of a solenoid or coil member 30 having an internal opening to slip over the semicylindrical stem 22 and having a winding 31 adapted to carry the alternating or otherwise varying current to which it is desired that the movements of the member 25 be made responsive.

Figure 6:
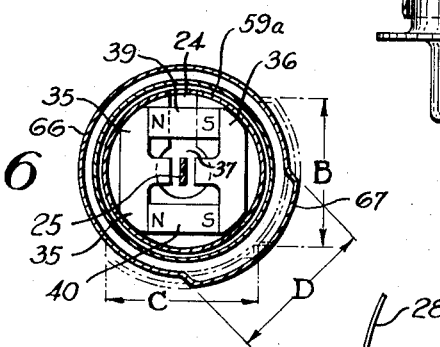
Figure 6 is a sectional view through the line 6—6 in Figure 5.

The magnetic structure whereby there is provided a permanent unidirectional field wherein the free tongue portion of the member 25 may operate as an armature comprises a pair of T-shaped "soft-iron" assemblies 35 and 36, preferably of laminated construction, the stems of the T's constituting polar projections oppositely and inwardly directed to form an air-gap 37. The outer arms of the assemblies 35 and 36 are bridged by permanent magnets 39 and 40 so disposed that each makes contact with similar poles of the two magnets. Thus, as shown in Figures 1 and 6 of the drawings, the north poles of both permanent magnets are in contact with the assembly 35 and the south poles with assembly 36, so that flux in the air-gap 37 may be considered as passing from left to right as seen in the drawings.

When the device is assembled with the member 25 mounted upon the stem portion 22, the coil 30 surrounding said stem portion is brought into close engagement with the corresponding face of the portion 21 of the member 20. The broad base part of the ferromagnetic member 25 will then lie substantially in the diameter of said coil, providing an optimum path for the flux in that part of the magnetic circuit. The magnetic structure comprising the assemblies 35—36 and the magnets 39—40 rests against the opposite face of the base 21, being secured in position by means presently to be set forth. The tongue portion of the member 25 then extends through the opening 23 and lies within the air-gap 37 with its contact-bearing portion projecting therebeyond and adapted for coaction with stationary contact members now to be described.

Positioned against the faces of assemblies 35—36 on the sides remote from the base 21 is a massive metal supporting block 41, a U-shape, as indicated, and insulatedly carrying stationary contact members 43 and 44, juxtaposed to opposite faces of the movable contact member 26 and adapted to be alternatively engaged thereby as the latter member is moved back and forth with motion of the movable member 25. Each of the stationary contact members 43—44 takes the form of a thin flat strip of resilient contact metal formed basically to an L-shape with one arm extending across the face of the corresponding arm of the U-shaped block 41 and terminating in a loop portion adapted for connection of a conducting wire. The other arms of the L-shaped contact members extend substantially parallel to the axis of the main assembly, one on each side of the movable ferromagnetic member 25, and each has a tip portion angularly bent inward to be juxtaposed to, and engaged by, the movable contact member 26. The tip portions of the contact members 43—44 are preferably bifurcated, as indicated in Figures 1 and 3, whereby to reduce the probability of failure to complete the circuit between the stationary and the movable contact member should a particle of non-conducting material find its way onto a contact surface.

Extended screws 45, coacting with suitable clamping and insulating plates positioned opposite either face of the transverse portions of the contact members 43—44, pass through openings formed in the block 41, straddling the polar projections of the assemblies 35—36 and engage threaded openings 46 in the base portion 21, whereby, when tightened, to secure and clamp into an integral unit said base portion, magnetic structure, supporting block and stationary contact members. The conformation of the laminated parts of the magnetic structure is made such as to allow appreciable clearance around the screws, thus facilitating lateral adjustment, and exact centering of the air-gap 37, as assembly is effected.

Adjustment of the stationary contact members 43 and 44 toward and from the movable contact member 26 is effected by means of screws 47 and 48 transversely threaded through the respective arms of the U-shaped block 41, on a common axis, and provided with insulating tips adapted to bear upon the outer faces of said movable contact members and force them more or less toward the center line of the structure, according to the adjusted setting of said screws. With a view to eliminating organic material from the assembly, the insulating tips of the screws 47 and 48 may expediently be formed of spherical glass beads 49 spun into recesses formed in the extremities of the screws.

As hereinbefore pointed out, connection between the movable contact 26 and stationary parts of the external circuit is effected by means of a relatively stiff wire 28 having one end attached to said contact. The other extremity of said wire is secured in the following manner: Insulatedly supported by means of a screw 51 threaded into the yoke portion of the U-shaped block 41 is a forked member 52 positioned substantially on the axial center line of the main assembly. Attached to the member 52 is an elongated radially extending damping arm 53, terminating preferably in a slightly bent over portion so formed and disposed that with the wire 28 curved from the movable contact 26 to which it is attached at one end, and having its other end positioned in the slot of the forked member 52, said wire will lightly touch the free extremity of arm 53 at a point removed from the axis and will be free for motion in a transverse sense across the same. The purpose of this form of construction will hereinafter be set forth.

The apparatus, as thus far described may be enclosed in a cylindrical shell or casing 55 having a closed end toward which the extremity carrying the coil 30 is inserted, and at the other end being provided with a sealable closure 56, through which terminals or lead-in pins 57 are insulatively sealed and preferably adapted for plugging into a conventional socket such as is used with electronic equipment. One of said terminals is connected to the forked member 52 by means of a wire 58, and thus to the movable contact 26 through wire 28. Two of the remaining terminals 57 are connected to the contact members 43 and 44 by means of wires 59 and 60 respectively. Further terminals, not appearing in the drawings, are connected by means of leads 61 and 62 (shown in Figure 5) to the winding of the solenoid 30, thus providing complete electrical connection between the switching device and external circuits and permitting gas-tight sealing of the assembly. While leads 61 and 62 are shown extending toward the same end of casing 55 toward which leads 58—60 extend, leads 61, 62 may also be brought out through the opposite end of the casing 55 by providing that end with a closure member carrying lead-in pins as described in connection with closure 56.

Base portion 21 and the parts carried thereby are advantageously spaced from or supported on closure member 56 by a tubular electrostatic shield member 59a coaxial with base member 21 and encircling each of the contacts 26, 43 and 44 as well as the leads connected thereto. Base portion 21 may be provided with a seating surface in the form of an annular recess 21a to receive and locate shield member 59a.

Gas or vacuum tight sealing not only serves to exclude moisture and objectionable atmospheric contaminants from the sensitive contacting surfaces of the device, but also renders it possible more or less to evacuate the interior of the casing, or to surround the contacts and other electrical parts with an artificial atmosphere of any desired composition or pressure. By the use of suitably selected inorganic insulating media it is possible to exclude from the enclosure certain undesirable vapors known to emanate from some organic materials.

The shell of casing 55 may be of magnetic or of non-magnetic material, according to alternative operating principles presently to be set forth. In the form of the apparatus shown in Figure 4, shell 55 is of ferromagnetic material, thereby not only shielding the apparatus from the influence of possible external fields, but providing a return magnetic circuit for the alternating field produced by the coil 30 and exciting the magnetic member 25.

Consideration may now be given to operating performance of the apparatus as thus far described. As hereinbefore pointed out, the magnetic structure comprising the ferromagnetic assemblies 35 and 36 together with the magnets 39 and 40 provides a permanent field in the gap 37 wherein is centrally disposed the movable tongue of the ferromagnetic member 25. While the flux of this field will flow transversely of the short section of the member 25 lying within the gap 37, there will be no basic tendency for longitudinal magnetization of that part. Energization of the winding 31 by current flowing therein will set up a magnetic field tending to pass longitudinally of the member 25, to divide between the members 35 and 36 and find a return circuit through the shell 55. Thus, the magnetic circuit will include in series three air-gaps, viz. (1) the gap 37 wherein the flux divides into two portions between the faces of the member 25 and the respective salient poles of the assemblies 39 and 40, (2) the four short arcs of the annular space where the extremities of the ferromagnetic assemblies 35 and 36 approach the body of the shell 55, (3) the space between the closed end of the shell 55 and the extremity of the member 25 attached to the support 22. It will be realized that, however, close the design, the reluctance of the air-gap portion of the magnetic circuit comprising these last-named parts will be much higher than that of the ferromagnetic parts, so that close tolerances in the latter, and precise selection of the material to have high permeability are not of paramount importance in the design. It will further be appreciated that, since the assemblies 35 and 36 will at all times be at a common magnetic potential with respect to any flux originating in the coil 30, there will be no tendency for varying flux to pass through the permanent magnets 39 and 40.

As the tongue of the member 25 becomes magnetized due to magnetomotive force originating in the coil 30, it will be attracted toward one or other of the pole tips forming the gap 37; but, because only a small part of the total reluctance of the circuit is concentrated in this gap, the change in position of the tongue will have a negligible effect on the distribution between the pole-tips of that part of the magnetic flux originating in the coil 30. If the winding 31 be energized with unidirectional current, the tongue of the member 25 will be deflected in accordance with the polarity, bringing the movable contact member 26 into engagement with one or other of the stationary contact members 43—44, as the case may be. Moreover, said contact engagement will be effected in response to a relatively small flow of current in said winding; and, since the member 25 becomes saturated as this current value is exceeded, the contact pressure will not be proportionately increased with increasing current values. Thus the device may be used as a single-pole relay having two contact positions dependent upon the polarity of exciting current. If the winding 31 be excited with alternating current the tongue of the member 25 will oscillate in the air-gap 37, and the contact member 26 will alternately engage the stationary contact members 43 and 44, this engagement being characterized by an abrupt snap action substantially as the exciting current passes through the zero values of its cycle.

The function of the wire 28 in coaction with the arm 53 may now be considered. As previously stated, said wire lightly touches said arm and is free for motion in a transverse sense across the same. The force of engagement between these parts is pre-established, and is made such that under normal deflection of the contact member 26 the wire 28 will flex sufficiently that the point of engagement will not be varied. If, however, a tendency toward resonance appears, motion at said point will increase, whereupon, due to friction between the wire and the arm a dissipation of energy will take place. The amplitude of vibration of the loop of wire cannot build up beyond a value where the energy dissipated equals that supplied by motion of the contact member 26, which value involves only negligible amplitudes at the point of maximum displacement of the wire loop. Thus, the damping action becomes apparent only when damping is needed, and resonance is prevented without imposition of a continuous load on the moving parts.

The resilient characteristic of the wire 28 may also be utilized in adapting the device to operation as a biased relay. This possibility will be understood by reference to Figure 3. In order to obtain the desired mechanical bias, the wire 28, during assembly, and prior to being secured to the forked member 52, may be forcibly strained to one side as shown dotted at 28a in Figure 3. The free extremity of the wire is moved in an arc "A," lying in a plane perpendicular to the principal axis of the assembly, and thus given a permanent set. The end of the wire is then returned to the forked member 52, lying on the axis, and there secured, as by soldering. The helical curvature imparted to the wire by having been strained, causes it to function as a spring, forcing the contact member 26 into engagement with the stationary contact 43, where it remains at all times when the exciting winding 31 is deenergized. Energization of this winding with current of the proper polarity relative to that of the permanent magnetic field will tend to overcome the mechanical force due to the spring action of the wire 28 and at a critical value will cause the armature 25 abruptly to move from its biased position, separating the contact 26 from engagement with the stationary contact 43 and bringing it into engagement with contact 44. Thus with a bias imparted to the wire 28 and with direct current in the coil 30, the apparatus becomes a snap-acting single-pole double-throw relay.

Figure 5:
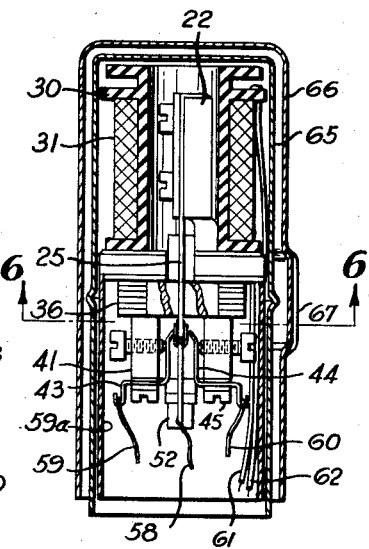
Figure 5 is a similar view of such a device incorporating an adjustable magnetic shunt.

The exacting requirements of operation as a synchronous contactor demand a high degree of symmetry in the action of the contact system; and adjustment of this feature beyond the possibility of manufacturing precision may be effected by suitably modifying the strength of the magnetic field on the two sides of the armature 25 in the air-gap 37. In order to obtain such adjustment there is provided a movable magnetic shunt juxtaposed to the magnetic structure and subject to convenient manipulation from the exterior of the device. One form which may be assumed by this adjusting means is shown in Figures 5 and 6, which in addition to the apparatus shown in side elevation in Figure 4, display the magnetic adjustment means now under consideration. The shell 55 shown in Figure 4 and described as of ferromagnetic material is, in the form shown in Figures 5 and 6, replaced by a shell 65 of similar dimensions, but formed of non-magnetic material such as brass. Closely surrounding the shell 65 is an outer shell 66 comprising a cup-shaped member formed of ferromagnetic material and cylindrical in conformation with exception of a portion 67, subtending an angle of about 90 degrees in the zone coinciding with the permanent magnet structure in the inner assembly. The portion 67 is made of greater diameter than the body of the shell of which it forms a part, and, with rotation of said shell about its axis may be caused to assume any angular position between those indicated dotted at "B" and "C" respectively in Figure 6. It will be seen that the material of the ferromagnetic shell 66, surrounding the magnetic structure, will tend to divert a small part of the permanent magnet flux, with a corresponding shunting action on the magnetic circuit. The gap subtended by the portion 67 of the shield being greater than that enclosed by the remainder of the periphery, the shunting action will there be of less magnitude. Thus, with the shell in the position "B," the ferromagnetic assembly 36 will be shunted less than the assembly 35, with a resultant tendency for the south (right-hand) pole facing the air-gap 37 to be stronger than the north (left-hand) pole, this tendency manifesting itself in a diversion of a small part of the permanent magnet flux into the longitudinal path comprising the member 25 and associated magnetic circuit components as hereinbefore set forth. If the shell be set in the angular position "C," with the enlarged portion 67 symmetrically related to both the members 35 and 36, both said members will be equally affected thereby, and there will be no tendency to disturb the symmetry of flux distribution in the air-gap 37. As indicated in full lines in Figure 6, the shell 66 is shown set in an intermediate position "D," where its distorting effect upon the magnetic field will be of a magnitude lying between its maximum as at "B" and its minimum as at "C." By the expedient of adjusting the angular position of the asymmetrical shield 66 it is thus possible to obtain a delicate adjustment of the flux distribution in the air-gap 37, with consequent symmetry of action of the armature 25 on the two sides of the true magnetic center of the system. It will be apparent that an adjustment similar to that just described may be obtained if the shield 66, instead of having formed thereon a portion 67 of larger diameter than the main body, is provided with an opening or a non-magnetic section in a similar location. With such a construction, however, there would be some sacrifice of the shielding from external magnetic fields which is provided by complete enclosure of the magnetic system in a ferromagnetic shell.

Figure 9:
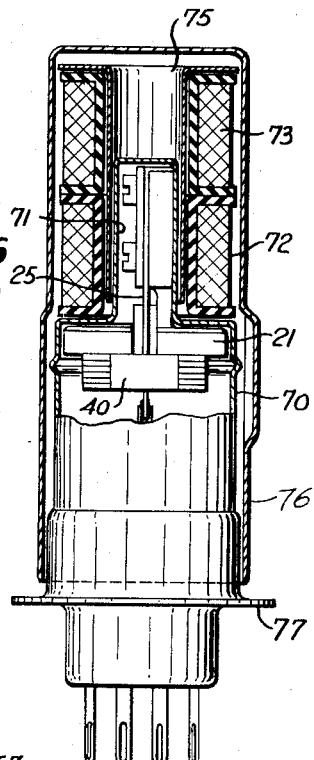
Figure 9 is a view, partly in section, of another embodiment of this invention.

In Figure 9 is shown another device embodying the principles of the invention in which the electrical winding is external to the gas-tight envelope enclosing the contacts. Referring to the drawing, the base portion 21 and the stem portion 22 of the member 20 together with the armature and contact assemblies supported thereby will be recognized as identical with the corresponding elements as hereinbefore discussed. A shell or casing 70 formed of non-magnetic material is provided with a cylindrical portion of dimensions similar to those of the shell 66 in Figure 5, enclosing the contact system and permanent magnet assembly, but having at its closed extremity a cylindrical section 71 of reduced diameter adapted to enclose only the stem portion 22 and the broad extremity of the ferromagnetic member 25 attached thereto. The electrical windings being located external to the shield or casing, their dimensions and construction are materially less restricted than when enclosed, as in the form of the invention hereinbefore discussed. As shown, there are provided two solenoids 72 and 73, axially positioned about the cylindrical section 71 of the shell 70 and more or less encircling the stem portion 22 and the ferromagnetic armature 25 carried thereby. The use of two separate coils is shown as exemplifying the flexibility of design possible with this arrangement. It makes possible excitation based on the sum, or the difference, of currents in mutually isolated circuits. The coils may, if desired, be wound to wholly different specifications, so as to obtain the resultant magnetomotive force derived from the combination of ampere-turn influences; for example, a relatively heavy current flowing in a few turns in one winding, and a small current flowing in another winding having a large number of turns. The possibility of thus combining different actuating windings greatly facilitates use of the device as a relay responsive to the resultant influence of two or more unidirectional currents.

When the coil assembly is of greater axial length than the stem 22 and projects appreciably beyond the fixed extremity of the ferromagnetic member 25, an improved flux distribution will be obtained by insertion of an annular member 75 of ferromagnetic material between the inside of the coil structures and the outside of reduced section 71 of the shell 70.

The form of the invention shown in Figure 9 is provided with an external, angularly adjustable, magnetic shield 76, identical in its general structure and function with the shield 66 of Figure 5. The whole device is shown, moreover, as mounted in a conventional multiple-terminal socket 77. The construction shown in Figure 9 not only permits greater latitude in the selection and arrangement of actuating coils, as hereinbefore mentioned, but, by excluding said coils from the internal space to be sealed, materially simplifies the problem of minimizing the amount of organic material in the sealed space.

An important advantage of the present invention results from the minimization of interaction between juxtaposed electrical parts. In general, the influence of electrostatic coupling and the effect of capacitance between conducting parts which may simultaneously attain different potentials are detrimental to satisfactory performance; and where potentials or frequencies reach high values may not only interfere with functioning but may accelerate structural deterioration of the apparatus. Recapitulating certain mechanical and electrical details which have been pointed out, it will be observed that substantial electrostatic shielding between the contact assembly and the exciting winding is obtained by placing these components on opposite sides of the massive base portion 21, as well as surrounding them with a shielding shell which by said base portion is divided substantially into two mutually isolated compartments containing the respective components. In the form shown in Figure 9 the shielding is even more effective.

Reduction of the area of the electrical part carried by the oscillating member specifically to the small contact member 26 insulatedly carried on the tip of the "grounded" part 25 materially reduces the capacitance of the movable contact to the frame of the device; and, in a similar manner, the mounting of the stationary contacts 43 and 44 insulatedly upon the "grounded" block 41 results in mutual juxtaposition of a much smaller surface to an interposed dielectric, with correspondingly reduced capacitance. Comparative tests between the device of the present invention have shown that the capacitance of the stationary contacts to "ground" in the present form is about half that in an earlier form, while the capacitance of the movable contact to "ground" is of the order of one twelfth that of the earlier form. Since as a matter of practical experience, under most operating conditions, it is the moving contact, rather than the stationary contacts, which is subjected to the greatest variation in potential, the outstanding advantage of this substantial reduction in capacitance will be obvious to those versed in the practical application of such devices.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An electrically actuated contacting device, comprising a base member of non-magnetic electrically conducting material conformed about a central axis with an opening therethrough containing said axis and a stem portion extending perpendicularly from one side of said base member and at least in part aligned with said axis, means for producing a substantially constant magnetic field perpendicular to said axis and including opposed elongated polar structures supported by said base member on the side remote from said stem portion and juxtaposed to provide an air-gap including said axis, said polar structures extending in a plane substantially perpendicular to said axis, magnetomotive means extending in said plane between each of the opposed extremities of said polar structures to maintain a substantially constant flux in said air-gap, a ferromagnetic member mounted upon said stem portion and having a deflectable armature part projecting axially through said central opening and positioned in said air-gap for displacement therein in the direction of said flux, first contact means extending along opposite sides of said armature part and operable thereby, stationary contacts insulatedly mounted on said base member and juxtaposed to said first contact on opposite sides thereof and adapted to be alternatively engaged by said first contact with displacement of the same in respective senses from an intermediate position, and means for impressing a variable magnetomotive force longitudinally upon said ferromagnetic member and comprising a winding encircling a portion of said ferromagnetic member on said one side of said base member.

2. An electrically actuated contacting device, comprising a non-magnetic electrically conductive base member having an aperture formed therethrough, a stem portion connected to and extending perpendicular from one side of said base member offset from the axis of said aperture, means for producing a substantially constant magnetic field perpendicular to said axis and including opposed elongated polar structures supported by said base member on the other side thereof and juxtaposed to provide an air-gap in registration with said axis, said polar structures extending in a plane substantially perpendicular to said axis, magnetomotive means extending in said plane between each of the opposed extremities of said polar structures for maintaining a substantially constant flux in said air-gap, an elongated ferromagnetic member mounted upon said stem portion and having a deflectable portion forming an armature projecting axially through said aperture and positioned in said air-gap for displacement therein in the direction of said flux, a first contact insulatedly carried by said armature and deflectable therewith, stationary contacts, means insulatedly and adjustably supporting said stationary contacts on the side of said polar structures away from said base member and connecting said stationary contacts to said base member, said stationary contacts being juxtaposed to said first contact on opposite sides thereof, and means for impressing a magnetomotive force longitudinally upon said ferromagnetic member and comprising a winding encircling said stem portion and a portion of said ferromagnetic member on said one side of said base member whereby said ferromagnetic member is deflected and said first contact is shifted relative to said stationary contacts.

3. An electrically actuated contacting device, comprising a non-magnetic electrically conductive base member having an aperture formed therethrough, a stem portion connected to and extending perpendicularly from one side of said base member offset from the axis of said aperture, means for producing a substantially constant magnetic field perpendicular to said axis and including opposed polar structures supported by said base member on the other side thereof and juxtaposed to provide an air-gap in registration with said axis, magnetomotive means associated with said polar structures for maintaining a substantially constant flux in said air-gap, an elongated ferromagnetic member mounted upon said stem portion and having a deflectable portion forming an armature projecting axially through said aperture and positioned in said air-gap for displacement therein in the direction of said flux, a first contact insulatedly carried by said armature and deflectable therewith, stationary contacts insulatedly mounted on said base member and juxtaposed to said first contact on opposite sides thereof, means for impressing a magnetomotive force longitudinally upon said ferromagnetic member and comprising a winding encircling said stem portion and a portion of said ferromagnetic member on said one side of said base member whereby said ferromagnetic member is deflected and said first contact is shifted relative to said stationary contacts, a stationary abutment mounted on said base member, and resilient conductive means connected to said first contact and said abutment.

4. An electrically actuated contacting device, comprising a non-magnetic electrically conductive base member having an aperture formed therethrough, a stem portion connected to and extending perpendicularly from one side of said base member offset from the axis of said aperture, means for producing a substantially constant magnetic field perpendicular to said axis and including opposed polar structures supported by said base member on the other side thereof and juxtaposed to provide an air-gap in registration with said axis, magnetomotive means associated with said polar structures for maintaining a substantially constant flux in said air-gap, an elongated ferromagnetic member mounted upon said stem portion and having a deflectable portion forming an armature projecting axially through said aperture and positioned in said air-gap for displacement therein in the direction of said flux, a first contact insulatedly carried by said armature and deflectable therewith, stationary contacts insulatedly mounted on said base member and juxtaposed to said first contact on opposite sides thereof, means for impressing a magnetomotive force longitudinally upon said ferromagnetic member and comprising a winding encircling said stem portion and a portion of said ferromagnetic member on said one side of said base member whereby said ferromagnetic member is deflected and said first contact is shifted relative to said stationary contacts, a stationary abutment mounted on said base member, resilient conductive means connected to said first contact and said abutment and a damping member connected to said abutment and extending into engagement with said resilient means at a point radially remote from said axis for inhibiting resonant oscillation thereof.

5. An electrically actuated contacting device, comprising a non-magnetic electrically conductive base member having an aperture formed therethrough, a stem portion connected to and extending perpendicularly from one side of said base member offset from the axis of said aperture, means for producing a substantially constant magnetic field perpendicular to said axis and including opposed polar structures supported by said base member on the other side thereof and juxtaposed to provide an air-gap in registration with said axis, magnetomotive means associated with said polar structures for maintaining a substantially constant flux in said air-gap, an elongated ferromagnetic member mounted upon said stem portion and having a deflectable portion forming an armature projecting axially through said aperture and positioned in said air-gap for displacement therein in the direction of said flux, a first contact insulatedly carried by said armature and deflectable therewith, stationary contacts insulatedly mounted on said base member and juxtaposed to said first contact on opposite sides thereof, means for impressing a magnetomotive force longitudinally upon said ferromagnetic member and comprising a winding encircling said stem portion and a portion of said ferromagnetic member on said one side of said base member whereby said ferromagnetic member is deflected and said first contact is shifted relative to said stationary contacts, an abutment fixed to said base member, and resilient means connected to said first contact and said abutment and for biasing said first contact toward one of said stationary contacts.

6. An electrically actuated contacting device, comprising a non-magnetic electrically conductive base member having an aperture formed therethrough, a stem portion connected to and extending perpendicularly from one side of said base member offset from the axis of said aperture, means for producing a substantially constant magnetic field perpendicular to said axis and including opposed polar structures supported by said base member on the other side thereof and juxtaposed to provide an air-gap in registration with said axis, magnetomotive means associated with said polar structures for maintaining a substantially constant flux in said air-gap, an elongated ferromagnetic member conductively mounted upon said stem portion and having a deflectable portion forming an armature projecting axially through said aperture and positioned in said air-gap for displacement therein in the direction of said flux, a first contact insulatedly carried by said armature and deflectable therewith, stationary contacts insulatedly mounted on said base member and juxtaposed to said first contact on opposite sides thereof, asymmetrical ferromagnetic means juxtaposed to said field-producing means for modifying the flux distribution therein, and means on said one side of said base member for impressing a magnetomotive force longitudinally along said ferromagnetic member and comprising a winding encircling said stem portion and a portion of said ferromagnetic member whereby said ferromagnetic member is deflected and said first contact is shifted relative to said stationary contacts.

7. An electrically actuated contacting device, comprising a ferromagnetic tubular member, a non-magnetic electrically conductive base member extending transversely in said tubular member spaced from the ends thereof and having an axial aperture formed therethrough, an elongated stem portion connected to and extending from one side of said base member, said stem portion at least in part extending in alignment and close spaced relation with the axis of said base member, means for producing a substantially constant magnetic field perpendicular to said axis and including opposed polar structures supported by said base member on the other side thereof within said tubular member and juxtaposed to form an air-gap through which said axis extends, magnetomotive means associated with said polar structures for maintaining a substantially constant flux in said air-gap, an elongated ferromagnetic member conductively mounted upon said stem portion and having a deflectable portion forming an armature projecting axially through said aperture and positioned in said air-gap for displacement therein in the direction of said flux, a first contact insulatedly carried by said armature and deflectable therewith, stationary contacts insulatedly mounted on said base member and juxtaposed to said first contact on opposite sides thereof, means for impressing a magnetomotive force longitudinally along said elongated ferromagnetic member and comprising a winding encircling said stem portion and a portion of said elongated ferromagnetic member whereby said elongated ferromagnetic member is deflected and said first contact is shifted relative to said stationary contacts, and said tubular member having a magnetically asymmetrical portion juxtaposed to said field-producing means and being angularly adjustable about said axis.

8. An electrically actuated contacting device, comprising a tubular member and a closure member sealed to and closing one end of said tubular member to form a substantially gas-tight envelope, a non-magnetic electrically conducting base member extending transversely in said envelope and having a central opening formed therethrough, said base member forming an electrostatic shield across the interior of said envelope spaced from either end thereof, an elongated ferromagnetic member axially mounted on said base member on one side thereof and having a deflectable armature portion thereof extending axially through said opening and on the other side of said base member, means for producing a substantially constant transverse magnetic field perpendicular to said axis and including opposed pole pieces on said other side of and supported by said base member, said deflectable armature portion being positioned in said air-gap for displacement therein transverse to said axis, first contact means extending along opposite sides of said armature portion and operable thereby, stationary contacts insulatedly mounted on said other side of said base member and juxtaposed to said first contact on opposite sides thereof, means for impressing a magnetomotive force longitudinally along said ferromagnetic member and comprising a winding encircling a portion of said ferromagnetic member on said one side of said base member whereby said ferromagnetic member is deflected and said first contact is shifted relative to said stationary contacts, and lead-ins sealed through said envelope and connected to each of said contacts.

9. An electrically actuated contacting device as set forth in claim 8, comprising a massive mounting block on the side of said pole pieces away from said base member and connected to said base member, said stationary contacts each being insulatedly connected to said mounting block, a damping member insulatedly connected to said mounting block and having a portion thereof radially spaced from said axis, and resilient means connected to said first contact and to said mounting block with an intermediate portion thereof in sliding engagement with said damping member at a point radially spaced from said axis.

10. An electrically actuated contacting device as set forth in claim 8, wherein said metallic tubular member is formed of non-magnetic material, a ferromagnetic member encloses said tubular member and has a magnetically asymmetrical portion juxtaposed to said field-producing means, and said ferromagnetic member is angularly adjustable about said axis.

11. An electrically actuated contacting device as set forth in claim 8, comprising a tubular electrostatic shielding member coaxial with said base member and extending between said base member and said closure member, said shielding member spacing said base member from said closure member and encircling said contacts.

12. An electrically actuated contacting device as set forth in claim 8, wherein said tubular member is electrically conductive and has an elongated portion of reduced diameter joined to the remainder thereof by a radially extending intermediate portion, said base member extending with its said one side adjacent to said intermediate portion of said metallic tubular member, the portion of said ferromagnetic member on said one side of said base member extending axially in said reduced diameter portion, and said winding is removably mounted exteriorly on said reduced portion of said tubular member.

13. An electrically actuated contacting device as set forth in claim 12, comprising a tubular ferromagnetic member interposed between said winding and said elongated ferromagnetic member.

References Cited in the file of this patent

UNITED STATES PATENTS

| | | |
|---|---|---|
| 1,159,189 | Dempster | Nov. 2, 1915 |
| 1,612,114 | Hall | Dec. 28, 1926 |
| 1,624,476 | Cummings | Apr. 12, 1927 |
| 1,676,973 | Amsden | July 10, 1928 |
| 2,060,235 | Miller | Nov. 10, 1936 |
| 2,486,394 | Eannarino | Nov. 1, 1949 |
| 2,547,026 | Winkler | Apr. 3, 1951 |
| 2,609,462 | Joseph | Sept. 2, 1952 |
| 2,614,188 | Williams et al. | Oct. 14, 1952 |
| 2,636,094 | Russell | Apr. 21, 1953 |
| 2,675,440 | Reifel | Apr. 13, 1954 |
| 2,698,366 | Howell | Dec. 28, 1954 |
| 2,758,173 | Riley | Aug. 7, 1956 |